May 12, 1959 R. A. ONANIAN 2,885,822
CONSTRUCTION SET
Filed June 29, 1956 4 Sheets-Sheet 2
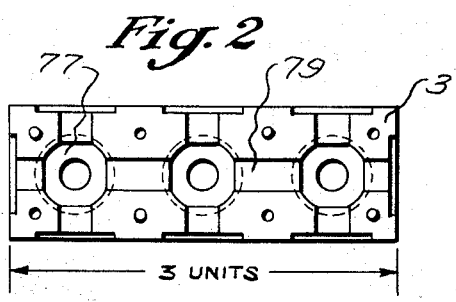
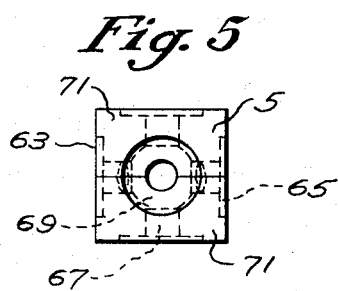
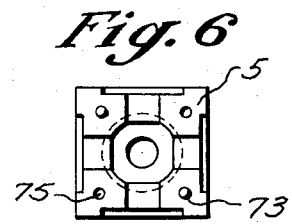
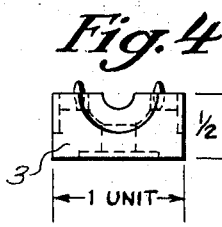
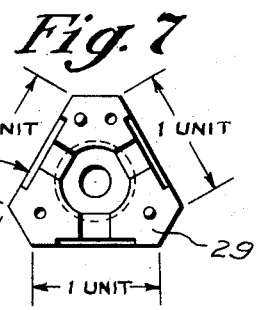
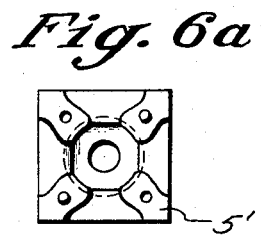
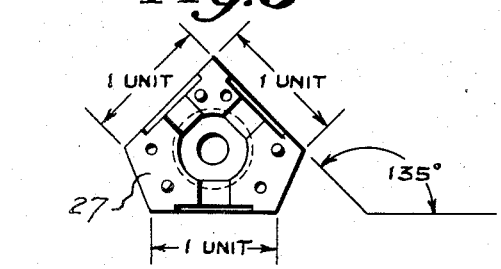
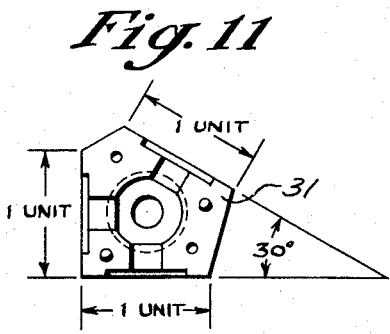
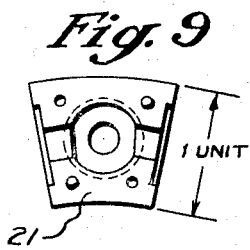
INVENTOR
RICHARD A. ONANIAN
BY *Robert J Path*
ATTORNEY

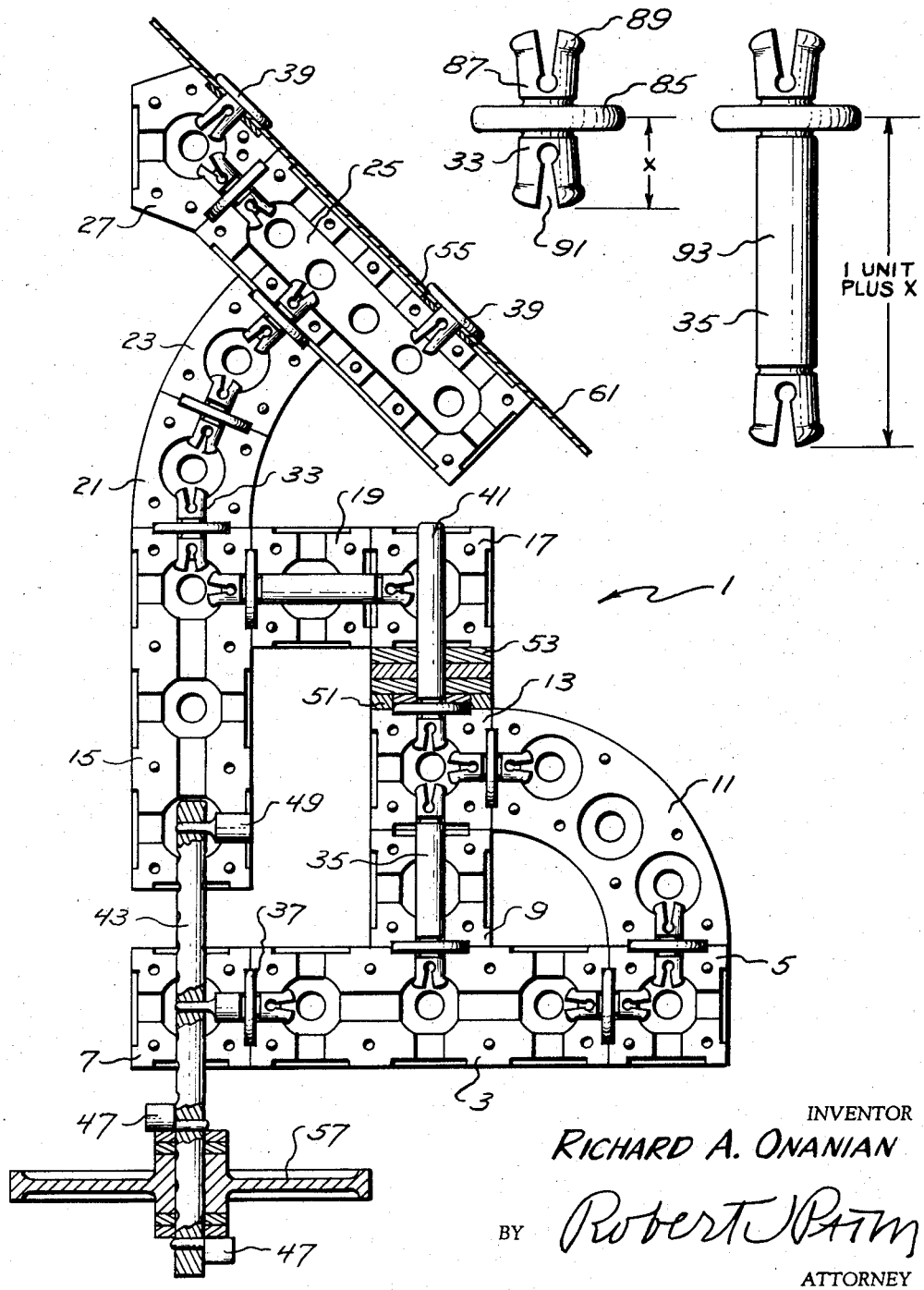

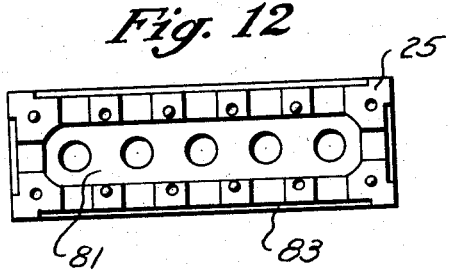
Fig. 12
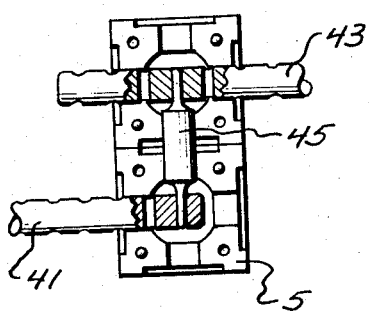
Fig. 18
Fig. 13a
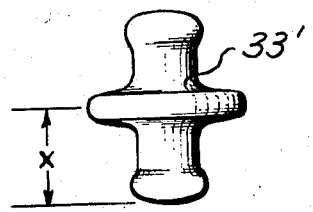
Fig. 16
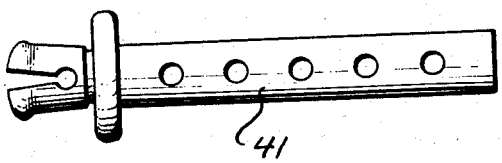
Fig. 22
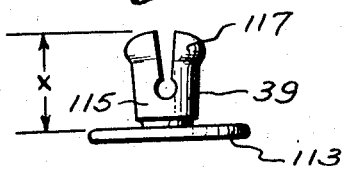
Fig. 10
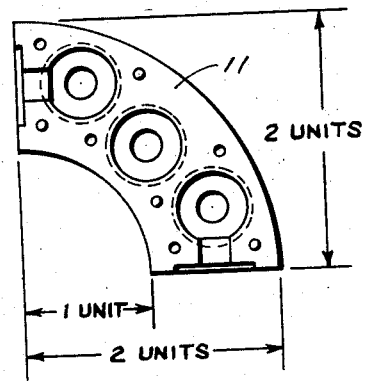
Fig. 27
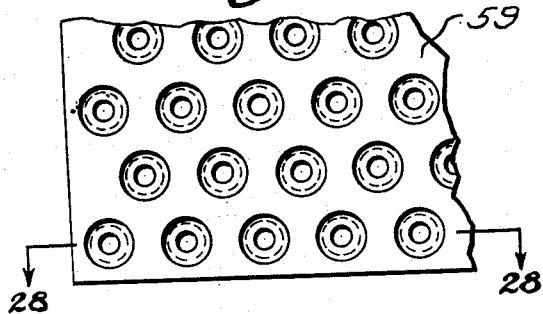
Fig. 28
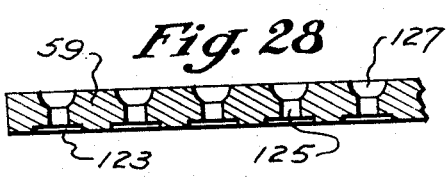
INVENTOR
RICHARD A. ONANIAN
BY Robert J Patm
ATTORNEY

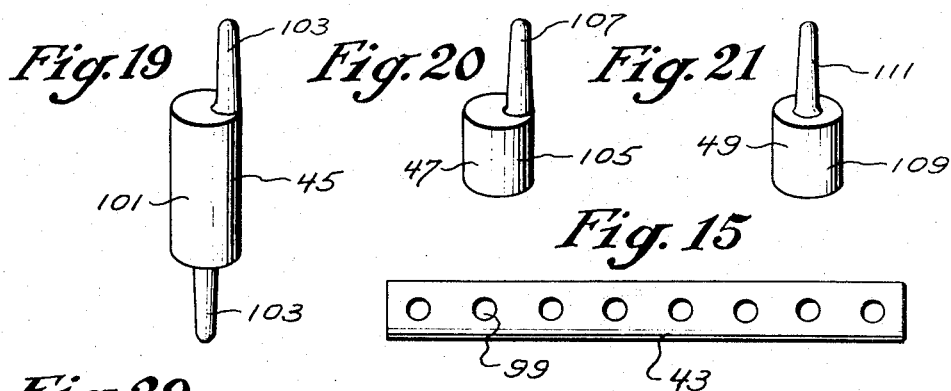
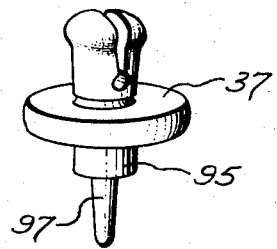
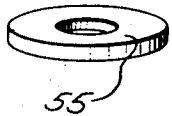
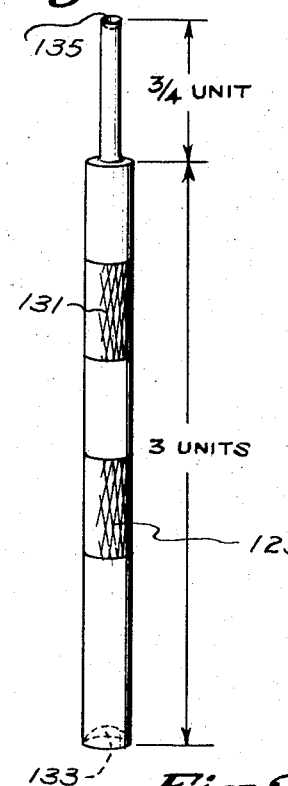
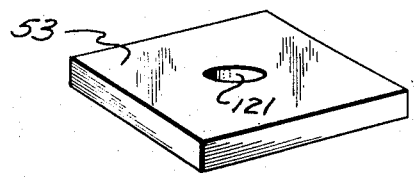
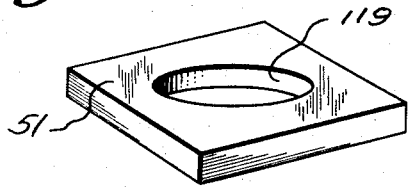
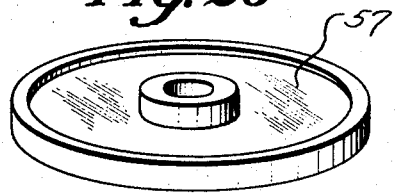

United States Patent Office 2,885,822
Patented May 12, 1959

2,885,822

CONSTRUCTION SET

Richard A. Onanian, Arlington, Mass.

Application June 29, 1956, Serial No. 594,937

3 Claims. (Cl. 46—26)

The present invention relates to construction sets, and more particularly to such sets which are comprised of a plurality of connectible and interchangeable units and which may be used as toys or in the construction of models or in similar ways.

Building sets such as toy construction sets and the like as heretofore known to the prior art have suffered from a great number of disadvantages. The means for connecting the various elements together have been visible and have detracted from the appearance of the finished toy or model. Moreover, the connecting or attachment means have heretofore formed an actual part of the structure and have thus greatly limited the variety of the forms which could be constructed. Another drawback of known devices has been that the assembly and disassembly thereof have been quite complicated and laborious; and this has destroyed the pleasure of the users. Furthermore, prior construction sets have lacked any close resemblance or similarity to actual three dimensional structures, and thus have not given a realistic or satisfying appearance.

Among the other drawbacks of the prior art has been the disadvantage that only the most simple or elementary structures could be constructed with known sets. These prior structures were not adapted to accommodate any moving parts and did not make use of the principles of applied building mechanics. Insofar as more complex structures could be achieved, these were accomplished at the expense of the regularity and natural formation of the completed structure. Another great disadvantage of prior art sets has been that the very nature of their construction made it impossible to finish off the structure, as by adding sidings or walls or coverings of any type. Finally, construction sets heretofore known to the prior art have been directed toward a relatively restricted age bracket or level of intelligence.

Although many attempts were made to overcome the foregoing and other difficulties and disadvantages, none, so far as I am aware, was entirely successful when carried into operation on a commercial scale.

Accordingly, it is an object of the present invention to provide a construction set which will permit the construction of models or toys closely resembling actual building or architectural framework.

Another object of the present invention is the provision of a construction set in which the connecting or attachment means will be essentially hidden or invisible.

A further object of the invention is the provision of a construction set enabling the employment of a wide variety of construction methods.

A still further object of the invention is the provision of a construction set capable of use in an almost unlimited variety of forms of construction.

The invention also contemplates the provision of a construction set which will permit the scaling of models to almost any ratio.

Another object of the invention is the provision of a construction set which will have a high degree of rigidity.

A further object of the invenion is the provision of a construction set which will permit the application and demonstration of the basic mechanical principles used in construction engineering, for educational or amusement purposes or the like.

It is also an object of the invention to provide a construction set which will be appropriate for all age groups.

The invention further contemplates the provision of a construction set which is structurally adapted to be enclosed or covered to any desired degree.

Finally, it is an object of the present invention to provide a construction set which will be simple and inexpensive to manufacture, quick and easy to assemble and disassemble, and rugged and durable in use.

Other objects and advantages of the present invention will become apparent from a consideration of the following specification, taken in conjunction with the accompanying drawings, in which:

Figure 1 is a view with parts broken away showing one of the many structures which may be assembled from the construction set according to my invention.

Figure 2 is a view of one-half of a block comprising one embodiment of my invention.

Figure 3 is a side elevational view of the half block of Figure 2.

Figure 4 is an end elevational view of the block of Figures 2 and 3.

Figure 5 shows a different embodiment of block.

Figure 6 shows half the block of Figure 5, in the same position as Figure 2.

Figure 6a is a further embodiment of blocks.

Figures 7 through 12, inclusive, show different embodiments of half blocks seen in the positions of Figures 2 and 6.

Figure 13 is a view of one form of clip according to the invention.

Figure 13a is a view similar to Figure 13 but showing a different embodiment of clip.

Figure 14 shows a still different form of clip.

Figure 15 shows a rod useful in the assembly of certain embodiments.

Figure 16 shows a combination clip and assembly rod.

Figure 17 shows yet another form of clip.

Figure 18 is a view with parts broken away showing one form of assembly.

Figures 19, 20 and 21 show different forms of pegs.

Figure 22 shows a still different form of clip.

Figures 23, 24 and 25 show various forms of washers and spacers useful with the invention.

Figure 26 shows a wheel which may be incorporated in the structure of various assemblies.

Figure 27 is a plan view of a base or supporting structure for the invention; and Figure 28 is a cross-sectional view of the base taken on the line 28—28 of Figure 27.

Figure 29 is a view of an ejection tool useful with the invention.

Referring now to the drawings in greater detail, I have shown in Figure 1 a typical assembly of a construction set according to my invention indicated generally at 1. The basic building elements of my novel set are blocks 3, 5, 7, 9, 11, 13, 15, 17, 19, 21, 23, 25, 27, 29, and 31. It will be noted that blocks 3 and 15 are identical, as are blocks 21 and 23, and also blocks 5, 7, 9, 13, 17, and 19. The connecting elements of my invention are double male clips 33, elongated clips 35, locking clips 37, single male clips 39, apertured clips 41, apertured bars 43, double offset locking pegs 45, single offset locking pegs 47, and single centered locking pegs 49. The spacers of my invention comprise square large hole washers 51, square small hole washers 53, and round washers 55. Additional structural elements incorporated in my invention are wheels 57, base or supporting plates 59, and sheets of covering material 61.

Referring now to Figures 5 and 6 for a detailed description of a basic type of block, there is shown in Figure 5 a block 5 having a plurality of flat faces 63 angularly related to each other. Block 5 is square; but the term "block" as used in this specification is not necessarily restricted to a square nor even a rectangular structure, but includes blocks having flat faces disposed at acute angles to each other, as well as blocks having curved surfaces such as blocks 21 and 11.

Each face 63 of block 5 is provided with a counterbore 65 which is shown as round but which may also be square or rectangular if desired. Centrally of each counterbore 65 is a bore 67 of substantially smaller diameter than its associated counterbore and which is normal to its associated flat face 63. The bores 67 open into a central cavity 69 which is of a diameter greater than any of the bores 67. This general arrangement of bores, counterbores and central cavities is common to all embodiments of blocks according to my invention.

Block 5 is comprised of two identical halves 71 mating along flat surfaces. The plane of the contiguous mating surfaces bisects two bores 67. Each half 71 is provided with equal numbers of complementary projections and recesses comprising pins 73 and holes 75, respectively. This is to say that on each half 71, the number of pins 73 equals the number of holes 75. The pins and holes are disposed in the flat mating surfaces between each pair of halves 71; and the location of the pins and holes is exactly reversed on either side of a plane perpendicular to the flat mating surfaces and including the axis of one of the bores bisected by the mating surfaces. This is to say that each half 71 has a plane of symmetry, except that the pins and holes are exactly reversed on either side thereof. The result is that all halves 71 may be cast in the same mould, and that any two halves 71 may be brought together in complementary mating relationship. The pins and holes provide locator means for precisely aligning the two halves relative to each other; and the two halves may be permanently and adhesively secured together. The structural relationship of the two mating halves of block 5 is the same for the other embodiments of blocks according to my invention, except the embodiment of Figure 11, which has no plane of symmetry. Hence, the block halves of the embodiment of Figure 11 must be cast in different moulds.

The embodiment of Figure 2 is somewhat different from the embodiment of Figure 5 in that it is three times as long as it is wide. It is provided with a greater number of bores and with three central cavities 77, which form in effect a single central cavity 79.

Figure 7 illustrates an embodiment of block in which the flat faces form in effect an equilateral triangle with truncated apices. In Figure 8, the angular relationships of the faces are 45 degrees and 90 degrees.

In Figure 9 is shown an arcuate or arch block 21, which may be used for the construction of rounded shapes. A similar arch block of greater extent is shown in Figure 10, the dimensions of which are even multiples of the lengths of any side of the basic block of Figure 5.

It will be appreciated that by use of these various configurations of blocks, straight, curved and branched structures may be assembled, the various portions of which have virtually any desired angular or positional relationship relative to each other.

In Figure 12, I have shown an elongated adaptor block 25 having a single central cavity 81 into which opens a large number of relatively closely spaced bores having on each side of block 25 a single, common elongated counterbore 83. The purpose of adaptor block 25 is to provide more accurate accommodation for odd lengths of structure than would be afforded by a regular elongated block such as block 3.

In Figure 13, I have shown the first of a variety of connecting means for the various blocks of my invention, comprising in this instance a double male clip 33 having a flange 85 and a pair of shanks 87 extending in opposite directions from flange 85 and of equal length and terminating in heads 89 and split centrally by bifurcations 91. Clips 33 are designed to join two adjacent blocks together in the position shown in Figure 1; and for this purpose, flange 85 is disposed in two adjacent counterbores 65, with shanks 87 extending into bores 67 and heads 89 resiliently detachably disposed in central cavities 69. The thickness of flange 85 is equal to the sum of the depths of counterbores 65 in which it is disposed. The length of shanks 87 is equal to the distance between flange 85 and either head 89; and this distance, in turn, is equal to the length of bore 67 between counterbore 65 and central cavity 69. Head 89 has a diameter normally greater than the diameter of bore 67; and inasmuch as the two halves of head 89 may be urged resiliently together in the space provided by bifurcation 91, head 89 may be resiliently deformed in this manner to permit passage through bore 67. Once seated in central cavity 69, however, the two halves of head 89 will again spring apart and resiliently detachably retain clip 33 in assembly with its associated block on either side. Thus, clip 33 may be resiliently attached to or detached from the block on either side thereof. It should be noted that heads 89 and central cavities 69 are of such relative size that when a plurality of heads 89 is received in a single cavity 69, the heads will nevertheless be spaced apart from each other so as to prevent interference therebetween. It will also be seen from an examination of Figure 1 that heads 89 do not extend sufficiently far into cavities 69 to block the passage of transverse rods to be later described.

In Figure 14 is shown an elongated clip 35 having an elongated shank 93 of a length equal to the length of shank 87 of clip 33, plus the thickness of a single unit block such as shown in Figure 5. All rectangularly constructed forms will be in multiples of this unit block; and therefore, with proper selection of pieces, a flush joint will result in all cases. However, the result of a particular construction may require the insertion of a member between two pre-established members, allowing no space to work the ends of the exposed clips into the holes in which they must be inserted. In such a case, clip 35 can be used to enter through an entire pre-established block and clip on the inserted member. Moreover, clip 35 permits rotation of the intermediate block, in such cases as this is desired.

In Figures 15, 16 and 17 is illustrated a group of members which are useful when fractions of unit blocks are involved, as for example when a complicated structure is closed and its ends brought together, as illustrated in Figure 1. In this case, locking clip 37, half of which is identical with clip 33, has a plain shank 95 terminating in a reduced pin 97, as seen in Figure 17. Pin 97 is adapted for entry into hole 99 of apertured bar 43, which bar will pass through and beyond, for example, block 7 in Figure 1 and pass through central cavity 69 of that block normal to bore 67 in which shank 95 of clip 37 is disposed. Pin 97 is disposed in that central cavity 69, in one of the holes 99. In Figure 16 is illustrated an apertured clip 41 combining the features of a clip with the features of bar 43.

The various pegs are useful for fastening miscellaneous parts together; and these are illustrated in Figures 19, 20 and 21. In Figure 19 is shown a double offset locking peg 45 having a cylindrical body portion 101 and a pair of offset pin ends 103, the purpose and function of which are illustrated in Figure 18. In Figure 20, single offset locking peg 47 has a cylindrical body portion 105 and a single offset pin end 107, the purpose of which is illustrated in Figure 1; and in Figure 21, single centered locking peg 49 has a cylindrical body portion 109 and a single centered pin end 111, the purpose of which is also illustrated in Figure 1.

A somewhat different form of clip and block assembly is illustrated in Figures 6a and 13a. The relationship of the dimensions of the bore and counterbore and central cavity of block 5' as seen in Figure 6a are the same as corresponding dimensions of block 5, with regard to the associated dimensions of the flange, shanks and heads of clip 33' of Figure 13a. The difference, however, is that reliance for resiliency is placed on the inherent deformability of one or the other of block 5' and clip 33', inasmuch as clip 33' is solid and without any bifurcation. Thus, if block 5' is cast of metal, then clip 33' must be a resiliently displaceable substance so that the heads thereof can be reduced in diameter when pushed through the corresponding bores. On the other hand, if clip 33' is of metal, then block 5' must be of a resiliently deformable material. Preferably, both block 5' and clip 33' are cast of a plastic having limited resiliency.

Single male clip 39 performs a somewhat different function from the other clips. Clip 39 is shown in detail in Figure 22 to comprise a flange 113 having on only one side thereof a single shank 115 terminating in a bifurcated head 117 which extends into the central cavity of any of the various blocks thereby resiliently to retain clip 39 in place. The purpose of clip 39 is to hold sheets of covering material 61 on associated flat surfaces of the block; and to this end, the length of shank 115 is slightly greater than the sum of the lengths of its associated bore and the depth of its associated counterbore. Thus, the inner surface of flange 113 of clip 39 projects slightly outward from the associated flat face of its carrier block, preferably by the thickness of a sheet 61 of covering material. Preferably, clip 39 is used in connection with washer 55 as shown in Figure 24, washer 55 having a thickness equal to the depth of the associated counterbore so as to provide a support surface for sheet 61 flush with the remainder of the flat block surface. Washer 55 encircles shank 115; and flange 113 and washer 55 resiliently grip between them a sheet 61. It should also be noted that head 117 is spaced apart from any of the other such heads as may be in the associated central cavity.

The axial thickness of flange 113 is equal to the depth of its associated counterbore, and hence is much less than the thickness of the flanges of the other embodiments of clips. This is so that when washer 55 is not used, and sheet 61 is quite thin and flexible, flange 113 may be pressed down into its associated counterbore until the outer surface of flange 113 is flush with the outer surface of sheet 61. In this way, a very neat and smooth covering is achieved.

In Figures 23 and 25, I have illustrated square washers 51 and 53 having therein large hole 119 and small hole 121, respectively. These square washers are for the purpose of bridging gaps of fractional unit lengths; and it should be noted that a bar 43 or shank 93 will just pass through small hole 121; while a flange 85 or washer 55 will just pass through large hole 119.

In Figures 27 and 28 is illustrated a supporting plate 59 which may be used to give a base or other support to an assembled construction set, to render the assembled set portable and to give it greater rigidity and stability. As there seen, plate 59 is provided with a multiplicity of holes therethrough including counterbores 123 and bores 125 as described above, and, in addition, enlargements 127 corresponding functionally to the central cavities of the block for the purpose of receiving the heads on the clip shank.

As can readily be seen, the assembled blocks can be readily disassembled simply by pulling them apart. However, it is difficult to disengage certain of the clips from the blocks themselves because of the limited gripping surface on the relatively small clips. Accordingly, I have provided a means for ejecting clips and pins, comprising an ejection tool 129 as seen in Figure 29. As there shown tool 129 is provided with a knurled handle 131 and has a large recessed end 133 and a small recessed end 135. End 133 is used to push against the heads of clips from the inside of the carrying block; and it will be seen that the inclined sides of the recess at end 133 will push the two halves of the head together to aid in ejecting the clip. Small end 135 is used for ejecting pins.

From all of the foregoing, it will be obvious that I have achieved all of the initially recited objects of my invention.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. In a construction set, a pair of blocks having flat, contiguous faces, each said face having a counterbore therein, each said block having a bore therethrough normal to its associated said face adjacent said associated face and disposed centrally of and of substantially less diameter than its associated said counterbore, said bores being axially alighed with each other adjacent said counterbores, each said block having a central cavity of substantially greater diameter than and communicating with its associated said bore, and a clip having a flange of an axial thickness equal to the sum of the depths of said counterbores, said flange being disposed in said counterbores, said clip having a pair of axially aligned shanks, one on either side of said flange, extending in opposite directions into said bores and central cavities of said blocks to maintain said blocks in detachable assembled relationship, at least one of said shanks terminating in a head having a diameter greater than the diameter of its associated said bore, said head being resiliently detachably retained in its associated said central cavity, the length of said one shank between said flange and said head being equal to the length of its associated said bore between its associated said counterbore and central cavity.

2. The invention of claim 1, said shanks being of equal length and each terminating in a said head.

3. The invention of claim 1, and a third block having a said bore and central cavity, one of said pair of blocks being disposed between said third block and the other of said pair of blocks, the other of said shanks having a length equal to the length of said one shank plus the thickness of said one block and extending through said one block and into said bore of said third block and terminating in a said head in said central cavity of said third block.

References Cited in the file of this patent

UNITED STATES PATENTS

| 115,214 | Jones | May 23, 1871 |
| 419,099 | Arold | Jan. 7, 1890 |
| 2,013,771 | Tompkins | Sept. 10, 1935 |
| 2,093,341 | Reiche | Sept. 14, 1937 |
| 2,236,926 | Surface | Apr. 1, 1941 |
| 2,751,705 | Joseph | June 26, 1956 |
| 2,765,581 | Adler | Oct. 9, 1956 |
| 2,794,293 | Mibrod et al. | June 4, 1957 |
| 2,795,893 | Vayo | June 18, 1957 |

FOREIGN PATENTS

| 310,300 | Switzerland | Dec. 16, 1955 |
| 870,511 | Germany | Mar. 16, 1953 |
| 1,062,530 | France | Dec. 9, 1953 |